United States Patent [19]

Duncan et al.

[11] 4,057,206
[45] Nov. 8, 1977

[54] EJECTION SEQUENCING SYSTEM WITH AIRSPEED AND ALTITUDE SENSING

[75] Inventors: James W. Duncan, Arden; Walter R. Peck, Asheville, both of N.C.

[73] Assignee: Stencel Aero Engineering Corporation, Asheville, N.C.

[21] Appl. No.: 693,843

[22] Filed: June 8, 1976

Related U.S. Application Data

[63] Continuation of Ser. No. 587,277, June 16, 1975, abandoned.

[51] Int. Cl.² .............................................. B64D 17/62
[52] U.S. Cl. .................................... 244/147; 73/204; 73/212; 244/122 AE
[58] Field of Search ............... 244/141, 122, 150, 149, 244/138 R, 147, 140, 139; 73/181, 189, 204, 212

[56] References Cited

U.S. PATENT DOCUMENTS

| | | | |
|---|---|---|---|
| 2,536,037 | 1/1951 | Clousing et al. | 73/204 |
| 2,661,624 | 12/1953 | Bechberger et al. | 73/204 |
| 2,750,798 | 6/1956 | Ruskin et al. | 73/204 |
| 2,959,958 | 11/1960 | Savet | 73/204 |
| 2,970,475 | 2/1961 | Werner | 73/204 |
| 3,067,973 | 12/1962 | Halsey et al. | 244/140 |
| 3,547,383 | 12/1970 | Carpenter | 244/150 |
| 3,669,388 | 6/1972 | Kreuningen | 244/138 R |

Primary Examiner—Trygve M. Blix
Assistant Examiner—Galen L. Barefoot
Attorney, Agent, or Firm—Roylance, Abrams, Berdo & Kaul

[57] ABSTRACT

An ejection sequencing system used particularly in an ejection seat operation includes continuous sensing of both airspeed and altitude. The continuous airspeed sensing is accomplished by continuously measuring the airstream temperature and then determining the optimum instant for parachute deployment from the measured temperature, thus making the deployment event temperature-responsive. When the sensed airspeed is within a predetermined acceptable limits, a first signal is generated. Continuous altitude sensing is accomplished by an aneroid barometer and when the sensed altitude is within predetermined acceptable limits, a second signal is generated. When these first and second signals are transmitted to the parachute container, they initiate parachute deployment. Redundant, failsafe system operation can be provided through the use of two or more interconnected airspeed sensing devices having fixed time delays for backup.

6 Claims, 4 Drawing Figures

EJECTION SEQUENCING SYSTEM WITH AIRSPEED AND ALTITUDE SENSING

This is a continuation of application Ser. No. 587,277 filed June 16, 1975, now abandoned.

This invention relates to a system for deploying a parachute during ejection of an occupant from a disabled aircraft. More particularly, this invention relates to a system by which deployment of the parachute (which will lower the ejected occupant safely to the earth) is at least partially controlled by means of a true airspeed sensing mechanism responsive to the static and total temperatures of the airstream into which the occupant is ejected.

Ejection seats are often provided in aircraft, particularly military aircraft, for assuring that the occupant will be able to escape from the aircraft in an emergency situation, whether such situation is occasioned by aircraft failure or by combat conditions. In either event, once the seat is ejected from the aircraft, the manseat combination continues along its trajectory in the airstream for a predetermined time after which the recovery parachute is deployed out of its pack for lowering the man safely to the ground. It is obvious that an ejection can occur under varying types of conditions, such as high altitude or low altitude and high speed or low speed. Within these widely varying conditions, it is extremely desirable that some means be provided for automatically deploying the parachute at the earliest appropriate time.

In an ejection seat system, there are two basic parameters which govern the appropriate time for parachute deployment in any ejection situation. First, the true airspeed existing at the time the parachute is deployed must be beneath a certain limit, that limit being the one which produces opening forces which are within the structural capabilities of the parachute itself and which are physiologically tolerable for the ejectee. Second, deployment must not occur until the ejectee is below a certain altitude, that altitude being one at which a human being is capable of surviving for any protracted period of time. Ordinarily, this is considered to be an altitude of 15,000 feet.

Additionally, in an ejection seat system employing a means for sensing airspeed and altitude after ejection, some fixed time delay must be incorporated into the system to allow the man-seat combination to leave the airflow surrounding the aircraft and to enter the true free airstream. This time delay provides sufficient time for the airspeed and altitude sensing system to monitor and to react to the environment of the free airstream. As a result, this time delay is in the range of 0.1 to 0.2 seconds for a typical ejection operation, which would place the man-seat combination some 5 to 10 feet away from the aircraft and in the free airstream.

In such an ejection seat system with on-board airspeed/altitude sensing, it is necessary to actually measure the airspeed during the time interval in which the time delay is taking place. In the past, airspeed sensing systems have been of two general types, both of which employ pitot tubes, but such sensing systems have not proved to be altogether satisfactory. The common pitot tube system is an aerodynamic pressure measurement system which measures "equivalent" airspeed, working on the assumption that the altitude or density is that of sea level. However, parachute performance under conditions of widely varying air density for the most part is determined by "true" airspeed as opposed to "equivalent" airspeed and since the range in which the parachute may have to operate varies from sea level to 15,000 feet, this type of sensing system introduces an error in true airspeed which can be as great as 21% which is practically unacceptable. The other way commonly used for measuring airspeed is to use a true airspeed indicator and machmeter which measures dynamic pressure as well as static pressure and ambient temperature. While a system of this type is quite satisfactory for use in connection with airplanes which are ordinarily flying in a straightforward path at a particular altitude, their suitability for use in connection with an ejection seat is poor, because such systems are very complex and unreliable in the ejection seat environment. Pitot tubes are normally sensitive to their alignment with the airstream to such a degree that if the angle of the pitot tube with respect to the airstream is greater than 30°, the accuracy of the measurement is severely degraded. Thus, the use of a special pitot probe is required to extend the maximum value of this allowable probe angle to airstream angle to 60° or greater, without degrading system accuracy to an unacceptable value.

Also in the past all airspeed sensing and altitude sensing ejection seat systems operated on the basis of selecting fixed time delays, depending on the airspeed being above or below a predetermined value and the altitude being below 15,000 feet. These fixed time delays were selected either at the instant of ejection seat initiation or within 0.3 second after seat/aircraft separation. With these fixed time delays it was impossible to optimize the system sequencing for all ejection airspeeds. Each time delay was determined by the maximum ejection airspeed and altitude combination and it was hence too long for ejections occurring at any speed or altitude other than the maximum airspeed, maximum altitude combination.

With the foregoing in mind, it is, therefore, an object of the present invention to overcome the difficulties and deficiencies associated with the prior art and to provide instead a new and improved ejection seat sequencing system, incorporating continuous sensing of both airspeed and altitude.

Another object of the present invention is to provide means for combining the outputs of multiple sensors so as to achieve redundant, failsafe system sequencing to assure highly reliable successful system operation with either optimum or near optimum system sequencing even in the event of an airspeed sensor failure.

Another object of the present invention is to provide a novel airspeed sensing system wherein the airspeed is measured on the basis of the airstream static and total temperatures, which, of course, are not dependent upon the particular orientation of the man-seat combination in the airstream.

Other objects, advantages and salient features of the present invention will become apparent from the following detailed description, which, taken in conjunction with the annexed drawings, discloses a preferred embodiment thereof.

The foregoing objects are attained by providing an ejection seat sequencing system which includes a continuous airspeed sensing system which measures only two variables, namely, the free-stream total and static temperatures. Once these two temperatures are known, the true airspeed can be calculated by means of an equation and the equation itself can be solved by an electrical or electronic circuit. Such a circuit continuously measures the difference in the voltages arising from the difference in the sensed total and static temperatures, and compares that value with a reference voltage. When the value of the differential voltage reaches the value of a reference voltage, an electrical signal is transmitted to an altitude switch operated by a pressure device such as an aneroid bellows. In this manner, the electrical circuit determines when the airspeed is proper and the aneroid bellows determines when the altitude is proper, and when both proper conditions have been met, the appropriate signal is transmitted from the altitude switch to commence deployment of the parachute.

In the apparatus of the present invention, there are provided two or more airspeed sensors physically located at different points on the ejection seat, each having an electrical or electronic circuit operating as previously described. In addition, these circuits are interconnected in such a way as to require that both airspeed sensing systems indicate that the seat/occupant has reached the desired airspeed before either of the two circuits transmit an electrical signal to either or both of two altitude switches.

The output of the airspeed sensors may be electrical, mechanical, or other form suitable for functioning in the existing environment. Since different techniques exist for measuring static temperature of the airstream as well as total temperature, all such means are not set forth herein, and instead, only representative devices which comply with the operating principles of this present invention are discussed.

Referring now to the drawings, which form a part of this original disclosure:

Figure 1:
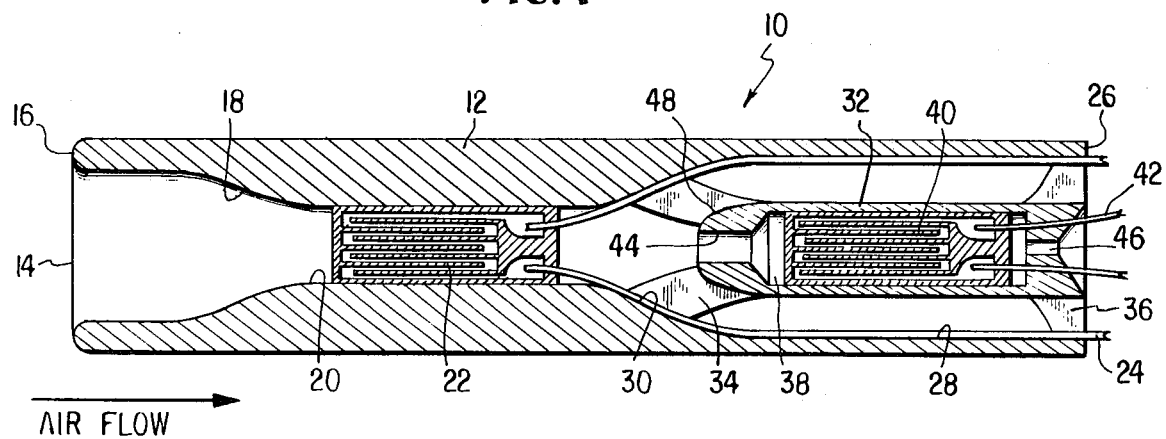
FIG. 1 is a transverse sectional view of apparatus in accordance with the principles of the present invention.

Referring now to the drawings in further detail, there is illustrated herein in FIG. 1, airspeed sensing apparatus in accordance with the principles of the present invention, such apparatus being generally designated 10. The apparatus includes an airstream probe in the form of an elongated tubular housing member 12 having an open forward end 14 which is smoothed and rounded in configuration at its edge as shown at 16. An internal cavity 18 is provided at the forward end of the housing such cavity 18 gradually diminishing in cross-sectional diameter from the inlet end 14 to an elongated restricted throat portion 20. A static temperature sensing device 22 is positioned in the throat 20 and the electrical leads 24 of this sensing device extend rearwardly through the remainder of the housing 12.

The rear end of the housing 12 is designated 26. A cylindrical bore 28 is provided in the rear portion of the housing extending from the rear end 26 toward the restricted throat portion 20. A tapering section 30 is provided where the bore 28 merges into the throat 20.

An interior housing member 32 is disposed centrally within the bore 28 and is retained therein by means of supporting vanes 34 connected between its forward end and the tapering portion 30 of the bore and rear vanes 36 connected between the rear end of the interior housing 32 and the rear end of the main housing 12. The interior housing 32 is provided with a central internal chamber 38 within which is disposed another temperature sensing device designated 40. Electrical leads 42 from the temperature sensing device 40 extend through the rear end of the interior housing 32.

The interior housing 32 is provided with an inlet orifice 44 at its forward end and an outlet or exit orifice 46 at its rear end. The diameter of the inlet orifice, as shown, is at least twice as great as the diameter of the exit orifice. The forward end of the interior housing 32 is rounded or tapered as shown at 48 to facilitate airflow around it. The inlet and outlet orifices 44 and 46 are aligned centrally within the apparatus 10 and hence are in alignment with the central axis of the throat 20.

The construction of the probe 12 of FIG. 1 is such that airflow from the airstream will enter through the inlet 14, pass through the internal cavity 18 and into the throat or restricted portion 20 where the temperature of such air is sensed by the sensor 22. The air then passes from the throat 20 into the bore 28. Such air passes through the vanes 34 and 36 and exhausts through the outlet end 26 of the housing. However, a portion of the air passing through the bore 28 enters the auxiliary housing 32 through the inlet 44 therein. This portion then passes into the internal chamber 38 where the temperature thereof is sensed by the sensor 40 and then exhausts through the outlet 46. The chamber 38 in the auxiliary housing forms a sheltered area where few if any normal airflow vectors are present.

Temperature sensing by means of the apparatus of FIG. 1 is used to calculate airspeed in accordance with the following formula:

$$V = \sqrt{\frac{(T_t - T) 2 \gamma g R}{(\gamma - 1)}} \quad [1]$$

wherein:
V = true airspeed (feet per second)
$T_t$ = free-stream temperature (degrees Rankine)
T = ambient temperature (degrees Rankine)
$\gamma$ = ratio of specific heats
g = gravity
R = universal gas constant Since it is known that for air $\gamma = 1.4$, $g = 32.2$ ft/sec and R = 53.3, the formula then becomes:

$$V = 109.6 \sqrt{T_t - T} \quad [2]$$

The temperature sensing device 22 serves as the free-stream temperature sensor for measuring $T_t$ while the temperature sensing device 40 serves as the ambient temperature sensor for measuring T. The electrical leads 24 and 42 connect these sensors with an electric circuit as is shown in FIG. 2.

Temperature sensing devices 22 and 24, which are illustrated as temperature responsive resistors, are connected in series circuit relationship with calibrating resistors 50 and 51, respectively, in two legs of a bridge circuit, the other two legs of which are formed by fixed resistors 52 and 53 of equal value. The junction between resistors 52 and 53 is connected to a Zener diode-regulated source of d.c. voltage +V and the junction between resistors 22 and 40 is connected to a point of lower potential at the junction between a Zener diode 54 and a fixed resistor 55, this Zener diode and resistor forming a regulated divider between the positive d.c. source and ground.

The remaining corners 56 and 57 of the bridge circuit are connected through fixed input resistors 58 and 59, respectively, to the input terminals of a conventional differential amplifier 60, the output of which is connected through an output resistor 61 to the gate electrode of a silicon controlled rectifier (SCR) indicated generally at 62. A feedback resistor 63 is connected between the output and one input terminal and a feedback resistor 64 is connected between the other input terminal and a point of reference potential which is formed by a Zener diode reference circuit including Zener diodes 65 and 66 and a resistor 67 connected in series circuit relationship with each other and in parallel circuit relationship with a battery 68. A second point of reference potential between diode 66 and resistor 67 is also connected to the amplifier to establish the operating level thereof. The end terminals of a potentiometer 70 are connected between the +V source of voltage and the cathode of SCR 62, the movable wiper of potentiometer 70 being connected to the gate of the SCR to establish an initial operating level adjustment. The output voltage is developed across a load resistor 71 which is connected between the cathode of SCR 62 and the junction between diode 54 and resistor 55.

Figure 2:
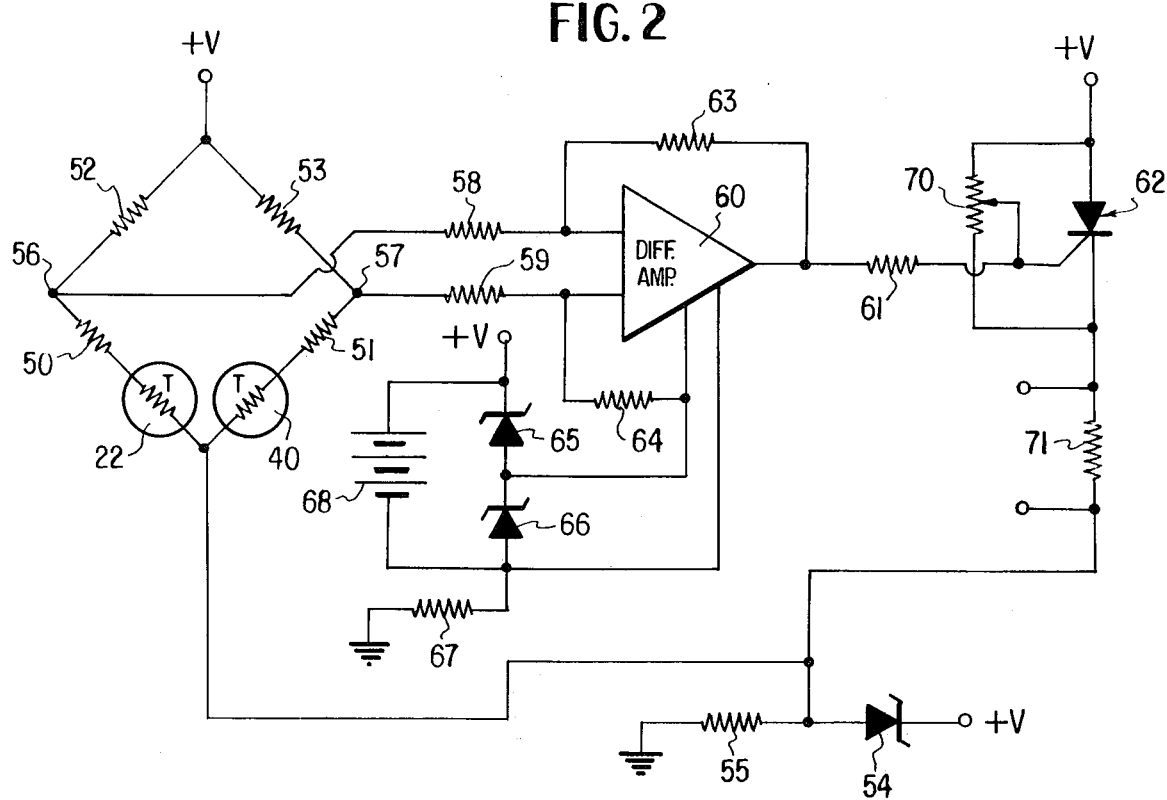
FIG. 2 is a circuit diagram for the airspeed sensing portion of the apparatus.

The operation of the circuit shown in FIG. 2 is as follows. When the resistance exhibited by sensing resistors 22 and 40 is equal, the bridge is balanced and no voltage appears between bridge corners 56 and 57, resulting in no output signal. However, when a sufficient difference between the temperature sensors 22 and 40 exists in a preselected direction, a difference in potential between points 56 and 57 is developed, producing a voltage difference at the input terminals of differential amplifier 60, which, being a high gain amplifier, produces an output signal through resistor 61 to the gate of SCR 62. The amplifier operating level and its output polarity is such that the SCR is held in a non-conductive state by the output signal of the amplifier. As the airspeed of the ejected seat decays and the temperature difference of the temperature sensors 22 and 40 also decays, when the desired airspeed is reached the amplifier output becomes such to render the SCR conductive, producing an output signal across load resistors 71. As previously indicated, this output signal is transmitted to an altitude switch.

Figure 3:
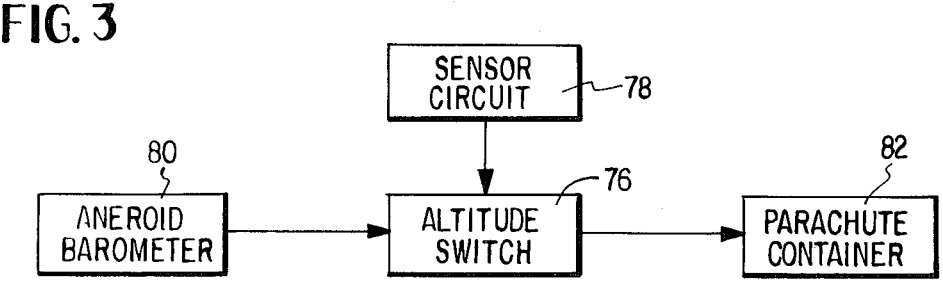
FIG. 3 is a block diagram showing the manner of operation of the present invention during an ejection seat sequencing operation.

Referring now to FIG. 3, there is designated therein in block diagram form an altitude switch generally designated 76 which is connected with the sensor circuit of FIG. 2, such circuit being generally designated 78. The output signal from the circuit 78 is transmitted to the altitude switch 76. An aneroid barometer generally designated 80, of a conventional design, is also connected with the altitude switch 76. The purpose of the aneroid barometer is to sense when the altitude is below a predetermined magnitude and altitude pressure. The inlet to the aneroid barometer is sheltered or shielded so that no dynamic pressure forces are sensed. Hence, the sensor circuit 78 senses the airspeed and provides an output signal to the altitude switch 76 only when the airspeed is within the predetermined safe range. The aneroid barometer 80 senses the altitude and provides an output signal to the altitude switch 76 only when the altitude is below its preset value. Once both signals have been properly transmitted to and received by the altitude switch 76, such switch closes to transmit a signal to a parachute container generally designated 82 for commencing deployment of the parachute therein.

Figure 4:
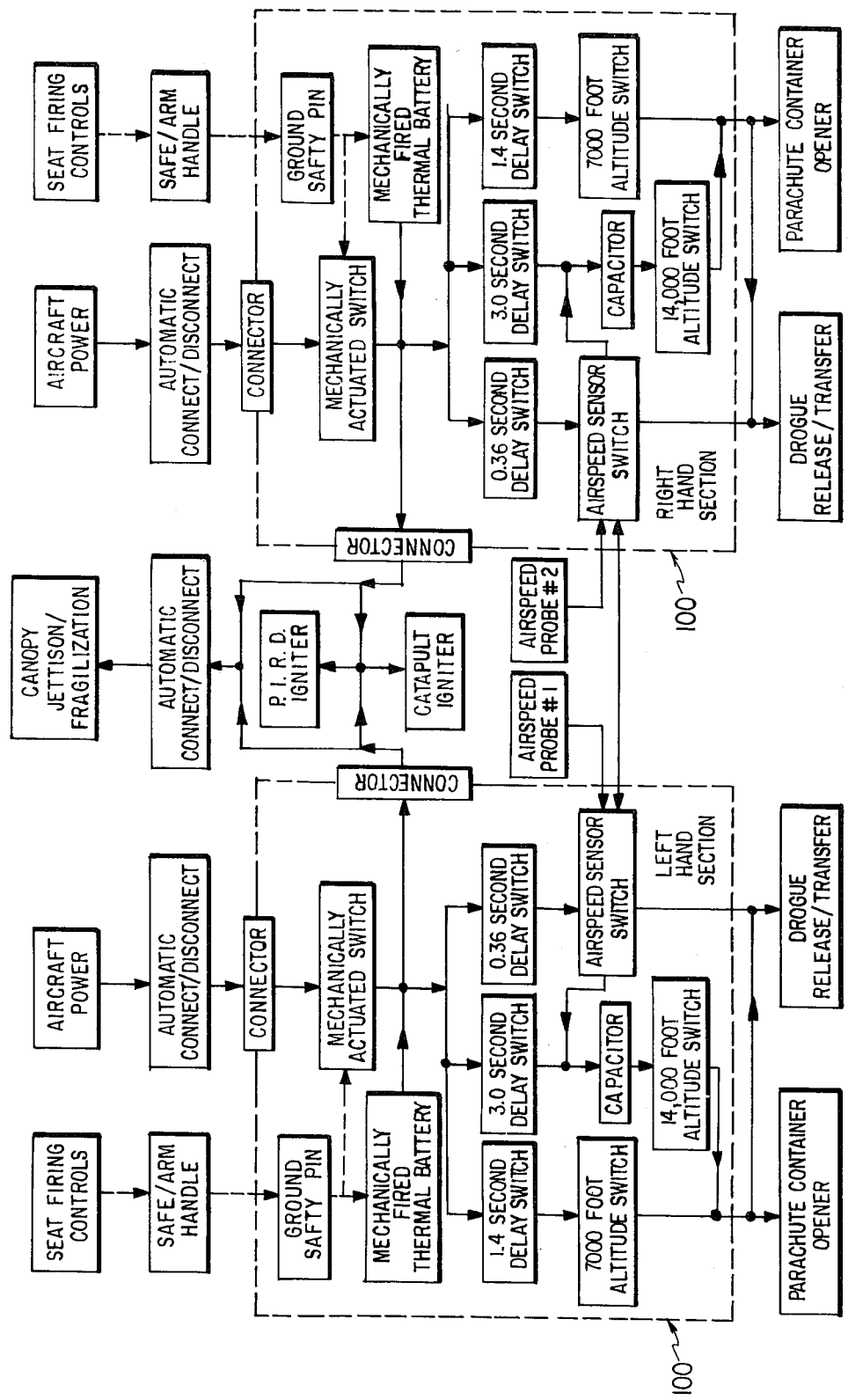
FIG. 4 is a block diagram showing an application of the present invention to an ejection seat with full system redundancy, failsafe operation, fixed time delay backup, and dual altitude mode selection being provided.

Referring now to FIG. 4, there is shown therein an ejection seat system with redundancy and failsafe features. The aircraft ejection seat generally designated 100 carries two complete systems and two probes, which are labelled Airspeed Probe 1 and 2. For convenience of illustration, the systems and seat are drawn in duplicate but it should be understood that both systems are in actuality employed on a single seat.

The Aircraft Power passes through an Automatic Connect/Disconnect to a Connector on the seat and from there to a normally open Mechanically Actuated Switch. The Seat Firing Controls are mechanically connected through a Safe/Arm Handle and a Ground Safety Pin connection to the Mechanically Operated Switch. In preparation for flight the Ground Safety Pin is removed and the Safe/Arm Handle is moved to the Armed position. Thus, when the Seat Firing Controls are actuated in flight, the ejection sequence is initiated by mechanically closing the Mechanically Operated Switch and energizing the Mechanically Operated Thermal Battery which requires some 50 to 60 milliseconds to get up to power.

Meanwhile, once the Mechanically Actuated Switch is closed, the aircraft power passes through a connector to initiate the Catapult Ignitor and the powered inertia reel device, called P.I.R.D. Igniter. It then passes through the Automatic Connect/Disconnect to the Canopy Jettison/Fragilization which either breaks or jettisons the aircraft canopy. The operation of the inertia reel holds the ejection seat occupant in position while the catapult starts ejecting the seat/occupant combination or ejected load from the aircraft. At a point in this ejection operation, the aircraft power is disconnected from the seat.

After the thermal battery has come up to rated output, it supplies the electrical power as required by the 0.36, 3.0, and 1.4 second delay elements and by the Airspeed Sensor Switch. Each airspeed probe connects to a sensor switch and the two Aircraft Sensor Switches are themselves interconnected, as shown by the cross arrow between them, so that if either switch is open, both are open. That is, if either sensor senses a high speed condition, both systems are blocked from further operation.

As soon as the Airspeed Sensor Switch receives information from the probe indicating that the true airspeed is below a predetermined maximum amount, such switch closes and sends a charge to the Capacitor. If the ejected load is then beneath 14,000 feet, the 14,000 Foot Altitude Switch is closed and the signal from the capacitor is transmitted directly to the Parachute Container Opener to open the container to commence parachute deployment while at the same time releasing the drogue parachute by the signal sent to the Drogue Release/Transfer. If the ejected load is above the 14,000 foot level, the 14,000 Foot Altitude Switch will remain closed thus preventing parachute deployment. By having the Airspeed Sensor Switch charge the Capacitor, sufficient power is available at whatever time the load reaches 14,000 feet, even if the thermal battery has already stopped functioning.

As can be noted, there are three time delays in the circuit of FIG. 4. The 0.36 Second Time Delay is needed for the sensor to sense the airspeed and come to equilibrium. The other two time delays are safety delays to assure that the parachute will be deployed satisfactorily even if both airspeed sensors malfunction. Thus, after 1.4 seconds, power is sent through the 1.4 Second Delay Switch to a 7,000 Foot Altitude Switch. If that switch is closed, meaning that the ejected load is at an altitude of less than 7,000 feet, the parachute container is immediately opened, regardless of whether the Airspeed Sensor Switch has operated. Similarly, after 3 seconds, power is sent through the 3.0 Second Delay Switch and Capacitor to the 14,000 Foot Altitude Switch. If that switch is closed, meaning that the ejected load is at an altitude of less than 14,000 feet, the parachute container is immediately opened, regardless of whether the Airspeed Sensor Switch has operated.

It should be apparent that various obvious changes and modifications can be made to the system disclosed herein without departing from the spirit and scope of the invention as defined in the appended claims.

What is claimed is:

1. An ejection sequencing system for controlling the deployment of a recovery parachute from its container, said recovery parachute being connected to an ejected load, said system comprising:

first means for continuously sensing pressure altitude and for generating a first signal when the pressure altitude of the ejected load is less than a predetermined maximum amount;

second means for continuously sensing the true airspeed of the ejected load in the airstream and for generating a second signal when the ejected load true airspeed is less than a predetermined maximum amount; and means responsive to said first and second signals for initiating deployment of the recovery parachute from its container;

said second means including an airstream probe having an air inlet end, an air outlet end and a flow passage extending therebetween, said flow passage having a restricted portion therein;

a first temperature sensing device disposed in said restricted portion of said flow passage for measuring the free-stream temperature of the airstream;

a second temperature sensing device disposed between said restricted portion and said outlet end for measuring the ambient temperature of the airstream;

means for determining the true airspeed of the ejected load from the difference between the ambient temperature and the free-stream temperature; and an interior housing for said second temperature sensing device disposed within said flow passage between said restricted portion and said outlet end, said interior housing being connected to said probe by vanes.

2. A system as defined in claim 1 wherein said interior housing includes a central cavity within which said second temperature sensing device is disposed, and an inlet and outlet port for said central cavity, said inlet port being directed toward said restricted portion and said outlet port being directed toward said outlet end.

3. A system as defined in claim 2 wherein the diameter of said inlet port is less than that of said restricted portion and wherein the diameter of said outlet port is less than that of said inlet port.

4. An airspeed sensing system comprising probe means positionable in the airstream, said probe means having an air inlet end, an air inlet end and a flow passage extending therebetween, said flow passage having a restricted portion therein; and temperature sensing means for measuring the free-stream static and total temperatures, said temperature sensing means including computing means for solving the formula:

$$V = 109.5 \sqrt{T_t - T}$$

where V is the true airspeed, $T_t$ is the free-stream temperature and T is the ambient temperature, said temperature sensing means comprising a first temperature sensing device disposed within said restricted portion of said flow passage for measuring the free-stream temperature of the airstream;

a second temperature sensing device disposed between said restricted portion and said outlet end for measuring the ambient temperature within said probe; and an interior housing for said second temperature sensing device disposed within said flow passage between said restricted portion and said outlet end, said interior housing being connected to said probe by vanes.

5. A system as defined in claim 4 wherein said interior housing includes a central cavity within which said second temperature sensing device is disposed, and an inlet and outlet port for said central cavity, said inlet port being directed toward said restricted portion and said outlet port being directed toward said outlet end.

6. A system as defined in claim 5 wherein the diameter of said inlet port is less than that of said restricted portion and wherein the diameter of said outlet port is less than that of said inlet port.

* * * * *